United States Patent [19]
Okajima et al.

[11] Patent Number: 5,334,993
[45] Date of Patent: Aug. 2, 1994

[54] LIQUID CRYSTAL DISPLAY DEVICE

[75] Inventors: Hiroyuki Okajima, Kita-Katsuragi; Shinichi Uratani, Osaka, both of Japan

[73] Assignee: Sharp Kabushiki Kaisha, Osaka, Japan

[21] Appl. No.: 939,825

[22] Filed: Sep. 3, 1992

[30] Foreign Application Priority Data

Sep. 4, 1991 [JP] Japan .................. 3-223961

[51] Int. Cl.⁵ .................................. G09G 3/36
[52] U.S. Cl. .......................... 345/102; 359/49
[58] Field of Search ......... 340/784 G; 359/70, 48–50, 359/80; 345/102, 87, 84

[56] References Cited

U.S. PATENT DOCUMENTS

| | | |
|---|---|---|
| 4,348,094 | 9/1982 | Hirohata . |
| 4,453,200 | 6/1984 | Trcka et al. .................. 359/48 |
| 4,909,604 | 3/1990 | Kobayashi et al. . |
| 4,945,350 | 7/1990 | Kawamura .................. 340/784 |
| 5,182,660 | 1/1993 | Tanaka .................. 359/50 |
| 5,280,372 | 1/1994 | Horiuchi .................. 345/102 |

FOREIGN PATENT DOCUMENTS

| | | |
|---|---|---|
| 3116144 | 11/1982 | Fed. Rep. of Germany ...... 340/784 |
| 3120601 | 12/1982 | Fed. Rep. of Germany . |
| 3-59588 | 3/1991 | Japan . |

*Primary Examiner*—Alvin E. Oberley
*Assistant Examiner*—Regina Liang
*Attorney, Agent, or Firm*—David G. Conlin; Robert F. O'Connell; Kevin J. Fournier

[57] ABSTRACT

A liquid crystal display device comprises a liquid crystal display panel, a light source for illuminating a back surface of the liquid crystal panel, a light guide for transmitting a light emitted by the light source to the back surface of the liquid crystal panel, a holding member for accommodating and fixing the light source at one end portion thereof and the light guide so that a surface of the light guide faces the back surface of the liquid crystal display panel, and a member for attaching the liquid crystal panel to the holding member so as not to disturb transmission of a heat emitting from the light source to the air through the holding member.

4 Claims, 3 Drawing Sheets

LIQUID CRYSTAL DISPLAY DEVICE

BACKGROUND OF THE INVENTION

1. Field of the Invention

The present invention relates to a liquid crystal display device for a laptop or note book type personal computer or word processor, and more particularly, to a liquid crystal display device having a uniform display surface and an improved display quality.

2. Description of the Related Art

FIGS. 1 and 2 show a conventional backlighted liquid crystal display device. In the figures, reference symbol 1 denotes a liquid crystal display plate; 2, an illuminating device (a back light); 21, a light source, such as a cold cathode tube (CCFT); 3, a light guide tube made of a transparent material; 4, a chassis made of a plastic; 22 and 23, plastic holding members for holding the light source 21; and 5, a metal frame (a metal bezel) for covering the four sides of the entire device.

In the conventional liquid crystal display device, the liquid crystal display plate 1 and the light source 21 are covered by the single frame member 5, and transfer of heat occurs between the liquid crystal display plate 1 and the illumination device 2. Thus, when the light source 21 is turned on, the generated heat transfers through or stays inside the frame member 5, increasing the temperature of the frame member 5. Such a heat reaches the liquid crystal display plate 21. The liquid crystal display plate 21 is characterized in that the threshold voltage thereof varies due to a fine temperature difference. Thus, when a temperature difference occurs between the portion of the liquid crystal display plate 1 near the light source 1 and the portion thereof which is located at a distance from the liquid crystal display plate 1, the liquid crystal display plate 1 has an irregular display density and hence the display quality thereof deteriorates.

SUMMARY OF THE INVENTION

It is therefore an object of the present invention is to provide a liquid crystal display device which can prevent transmission of a heat emitting from a light source to a liquid crystal display plate and which improves the display quality of the liquid crystal display plate.

A liquid crystal display device according to the invention comprises a liquid crystal display panel, a light source for illuminating a back surface off the liquid crystal panel, a light guide for transmitting a light emitted by the light source to the back surface of the liquid crystal panel, a holding member for accommodating and fixing the light source at one end portion thereof and the light guide so that a surface of the light guide faces the back surface of the liquid crystal display panel, and a member for attaching the liquid crystal panel to the holding member so as not to disturb transmission of a heat emitting from the light source to the air through the holding member.

The heat generated when the light source i s turned on does not stay inside the attaching member but dissipates into the air from the holding member.

Preferably, the holding member has a low coefficient of heat transfer and the attaching member is disposed separately from the light source so that i t can expose the holding member. Consequently, the heat from the light source dissipates substantially into the air from the holding member, and the amount of heat transferred from the light source to the liquid crystal display panel can be greatly reduced. As a result, irregular display density of the liquid crystal display panel can be reduced.

Further objects and advantages of the present invention will be apparent from the following description of the preferred embodiments of the invention as illustrated in the accompanying drawings.

DESCRIPTION OF THE PREFERRED EMBODIMENT

Description will now be made of preferred embodiments of the present invention.

Figure 3:
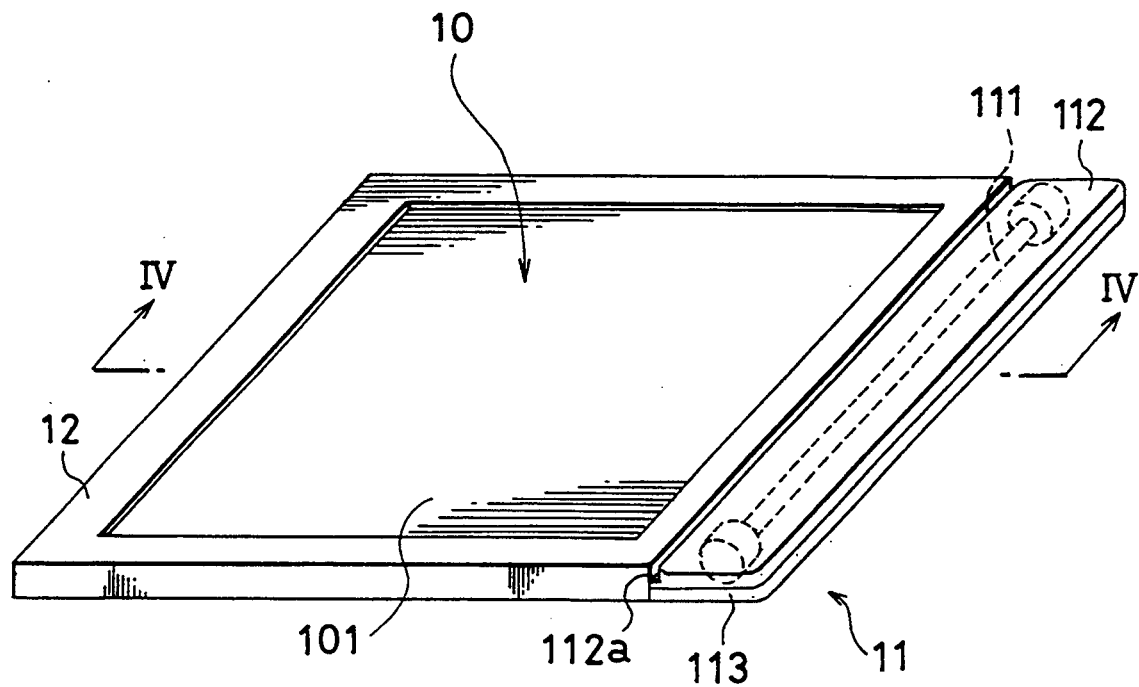
FIG. 3 is a perspective view showing the entirety of a liquid crystal display device showing an embodiment of the present invention.
Figure 4:
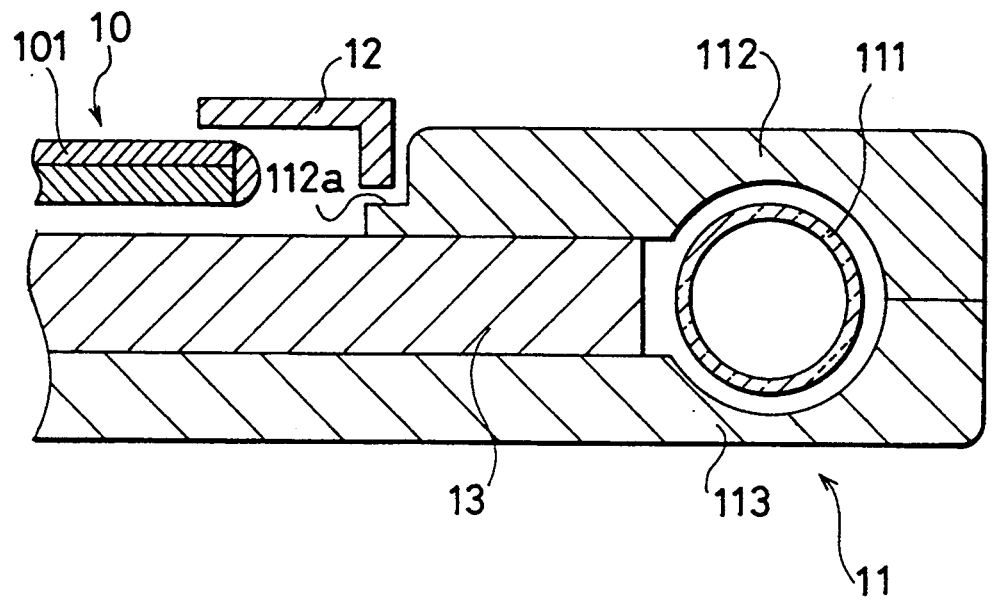
FIG. 4 is a cross-sectional view of the essential parts of the liquid crystal display device shown in FIG. 3.
Figure 5:
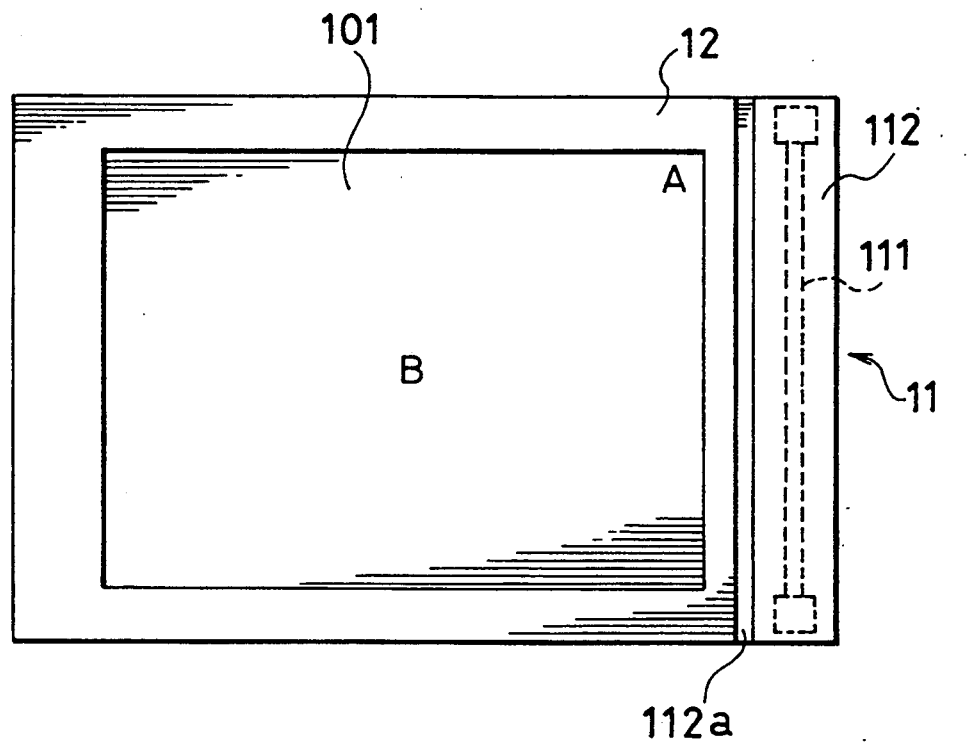
FIG. 5 is a plan view of the liquid crystal display device shown in FIG. 3.

FIG. 3 is a perspective view of the entire device, and FIG. 4 is a cross-sectional view of the essential parts of a liquid crystal display device according to the present invention. FIG. 5 is a plan view of Fig. 3.

As shown in FIGS. 3 through 5, a liquid crystal display device includes a liquid crystal display panel 10, an illuminating device 11 for illuminating the liquid crystal display panel 10 from behind, and a frame member 12 (a metal bezel) for fixing the liquid crystal display panel 10 at the front of the illuminating device 11.

The illuminating device 11 includes a light guide plate 13 disposed at the rear of and parallel to the liquid crystal display panel 10, a light source 111 disposed at one end portion of the light guide plate 13, and a holding member 112,113 (a plastic chassis) for holding the light source 111 and the light guide plate 13.

Figure 1:
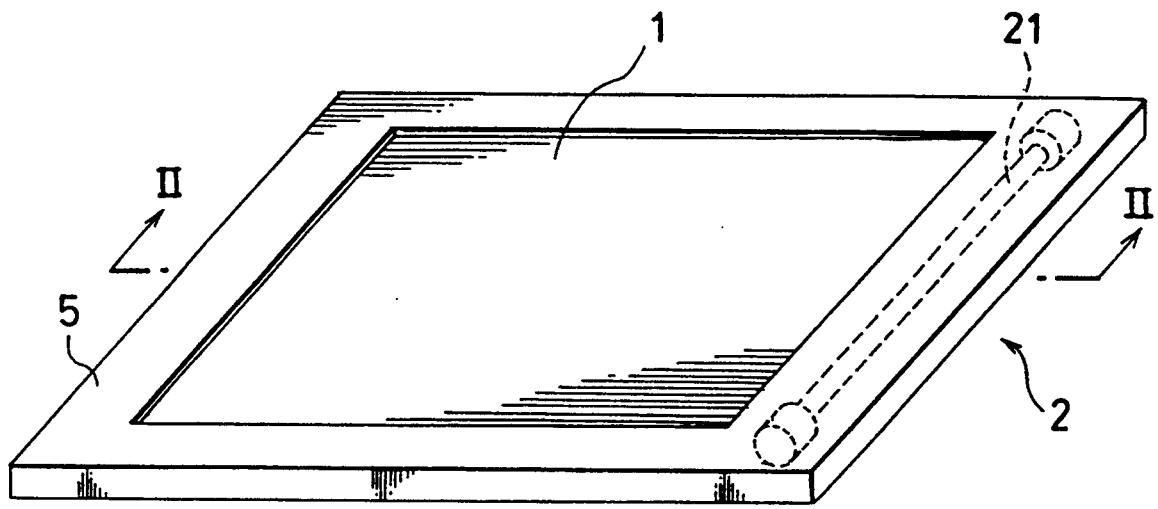
FIG. 1 is a perspective view showing the entirety of a conventional liquid crystal display device.
Figure 2:
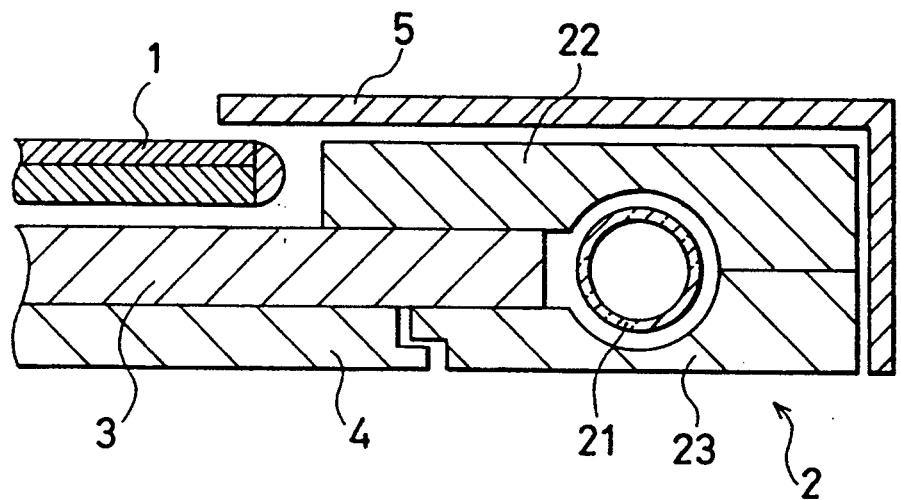
FIG. 2 is a cross-sectional view of part of the conventional liquid crystal display device of FIG. 1.

The light guide plate 13 is made of a flat plate-shaped acrylic resin, as shown in FIG. 1. The thickness of the light guide plate 13 is about 2.0 mm, and the length thereof is greater than a display region 101 of the liquid crystal display panel 10.

The light source 111 is a straight cold cathode tube (CCFT) consisting of a light emitter, such as a filament, and an outer tube which covers the light emitter. The diameter and length of the straight cold cathode tube are, for example, 4.1 mm and 164 mm, respectively. The power consumption of the straight cold cathode tube is 2.0 W.

The holding member consists of a front holding member 112 for holding the light source 111 from the front side thereof, and a rear holding member 113 for holding the light source 111 from the rear side thereof. Both of the front and rear holding members 112 and 113 are made of a plastic which does not transmit light therethrough and which has a low coefficient of heat transfer, such as polycarbonate or ABS resin. The front and rear holding members 112 and 113 are closely fixed to each other at the end portions thereof located on the outer side of the light source 111 by means of screws, whereby leakage of the light from the light source 111 is prevented. The front holding member 112 is disposed only on the light source side of the light guide plate 13.

The rear holding plate 113 is disposed ever the entire rear surface of the light guide plate 13 and also serves as a reflection sheet which reflects the light directed in a rearward direction in the light guide plate 13 toward the liquid crystal display panel 10. The front holding member 112 has a shoulder portion 112a for positioning the frame member 12 near the display region 101 of the liquid crystal display panel 10. The contact area between the shoulder portion 112a and the frame member 12 is minimized with the heat separation taken into consideration.

As shown in FIGS. 3 through 5, the frame member 12 has a picture frame-like shape when looked from above so that the illuminated surface can be displayed therethrough. The outer edge portion of the frame member 12 located near the light source 111 has an L-shaped cross-section so that it can be engaged with the shoulder portion 112a. The outer edge portion thereof other than that located near the light source 111 covers the end surface of the light guide plate 13, whereby entry of the disturbing light is prevented. Fixing claws (not shown) may be provided on the outer edge portion of the frame member 12 other than that located near the light source 111 so as to fix the frame member 12 to the liquid crystal display panel or illuminating device.

In the liquid crystal display device arranged in the manner described above, the light from the light source 111 enters into the light guide plate 13 from the end surface thereof and is directed inwardly. The inwardly directed light is reflected in the forward direction by the rear holding plate 113 and thereby illuminates the Fear surface of the liquid crystal display panel 10.

At that time, the temperature of the holding member increases due to the heat generated by the light source 111. However, in this embodiment as shown in FIG. 4, since the frame member 12 is separated from the light source 111 so that it exposes the holding member 112, 113, most of the heat from the light source 111 does not stay inside the frame member 12 but is radiated in the air from the holding member. The holding member 112, 113 is made of a material having a low coefficient of heat transfer. Thus, transfer of the radiated heat to the frame member 12 through the holding member can be prevented. As a result, the temperature difference which occurs in the liquid crystal display panel 10 can be reduced, and occurrence of irregular display density can be prevented and the display quality can be improved.

Concretely, the temperature of a corner portion A (see FIG. 5) of the liquid crystal display panel 10 which is located close to the light source 111 and which has the highest temperature and that of a central portion B located farthest from the light source 111 and having the lowest temperature were measured, and the measured temperatures were compared with those of the conventional liquid crystal display device shown in FIG. 1.

The measurements were conducted on the surface of tile liquid crystal display panel 10 one hour after the light source 111 has been turned on. Table 1 shows the results of the measurements. As shown in Table 1, a temperature difference is reduced in the present embodiment when compared with that in the conventional device. No display irregularity was visually observed.

TABLE 1

|  | Tube current | Surface temperature Portion A | Surface temperature Portion B | Temperature difference between A-B |
|---|---|---|---|---|
| Comparative example | 5 mA | 29.8° C. | 26.5° C. | 3.3° C. |
| Present embodiment |  | 27.8° C. | 26.5° C. | 1.3° C. |
| Comparative example | 6.5 mA | 31.5° C. | 27° C. | 4.5° C. |
| Present embodiment |  | 28.5° C. | 26.8° C. | 1.7° C. |

Having described a specific embodiment of out bearing, it is believed obvious that modification and variation of the present embodiment are possible without departing from the scope of the present invention.

For example, although the light source 111 is disposed only at one end portion of the light guide plate 13 in the above embodiment, it may be disposed at each of the two end portions thereof.

Many widely different embodiments of the present invention may be constructed without departing From the spirit and the scope of the present invention. It should be understood that the present invention is not limited to the specific embodiments described in the specification, except as defined in the appended claims.

What is claimed is:

1. A liquid crystal display device in use for a portable computer or the like, said device comprising:
    a liquid crystal display panel;
    a light source for illuminating said liquid crystal panel through a back surface thereof;
    a light guide for transmitting a light emitted by said light source to the back surface of said liquid crystal panel;
    a holding member made of a plastic having a low heat conductivity and light-shading quality for accommodating and fixing said light source at one or two end portions thereof and said light guide so that a surface of said light guide faces the back surface of said liquid crystal panel, said holding member having an engaging portion which is adjacent to the surface of said light guide which faces the back surface of said liquid crystal display panel, said holding member being open to the air except at said engaging portion; and
    a metallic frame member having an L-shaped cross-section and fixing said liquid crystal panel to said holding member at said engaging portion so as not to obstruct transmission of heat emitted from said light source to the air through said holding member, one end portion of said frame member being engaged with said engaging portion of said holding member when said frame fixes said panel in such a way as to obstruct transmission of heat emitted from said light source to said liquid crystal panel through said holding member, said engaging portion and said frame member.

2. A liquid crystal display device according to claim 1, wherein said holding member is constituted by a first holing portion including said engaging portion at one side thereof and a second holding portion accommodating and fixing said light guide in cooperation with said first holding portion.

3. A liquid crystal display device comprising:
    a liquid crystal display panel;

a light source for illuminating said liquid crystal panel through a back surface thereof;

a light guide for transmitting a light emitted by said light source to the back surface of said liquid crystal panel;

a holding member having a low heat conductivity and light-shading quality for accommodating and fixing said light source at one or two end portions thereof and said light guide so that a surface of said light guide faces the back surface of said liquid crystal panel; and means for fixing said liquid crystal panel to said holding member so as not to obstruct transmission of heat emitted from said light source to the air through said holding member and so as to obstruct transmission of heat emitted from said light source to said liquid crystal panel through said holding member and said fixing means, said holding member including an engaging portion which is adjacent to the surface of said light guide which faces the back surface of said liquid crystal display panel, said engaging portion being engaged with said fixing means when said fixing means fixes said panel, said holding member being open to the air except at said engaging portion, said holding member being constituted by a first holding portion including said engaging portion at one side thereof and a second holding portion accommodating and fixing said light guide in cooperation with said first holding portion, said fixing means being constituted by a metallic frame member having an L-shaped cross-section, one end portion of said frame member being engaged with said engaging portion of said holding member in such a way as to obstruct transmission of heat emitted from said light source to said liquid crystal panel through said holding member, said engaging portion and said frame member.

4. A liquid crystal display device comprising:

a liquid crystal display panel;

a light source for illuminating said liquid crystal panel through a back surface thereof;

a light guide for transmitting a light emitted by said light source to the back surface of said liquid crystal panel;

a holding member made of a plastic having a low heat conductivity and light-shading quality for accommodating and fixing said light source at one or two end portions thereof and said light guide so that a surface of said light guide faces the back surface of said liquid crystal panel; and means for fixing said liquid crystal panel to said holding member so as not to obstruct transmission of heat emitted from said light source to the air through said holding member and so as to obstruct transmission of heat emitted from said light source to said liquid crystal panel through said holding member and said fixing means, said holding member including an engaging portion which is adjacent to the surface of said light guide which faces the back surface of said liquid crystal display panel, said engaging portion being engaged with said fixing means when said fixing means fixes said panel, said holding member being open to the air except at said engaging portion, said holding member being constituted by a first holding portion including said engaging portion at one side thereof and a second holding portion accommodating and fixing said light guide in cooperation with said first holding portion, said fixing means being constituted by a metallic frame member having an L-shaped cross-section, one end portion of said frame member being engaged with said engaging portion of said holding member in such a way as to obstruct transmission of heat emitted from said light source to said liquid crystal panel through said holding member and said frame member.

* * * * *